United States Patent [19]

Ford

[11] 4,441,977
[45] Apr. 10, 1984

[54] ELECTROLYTIC CELL WITH SEALING MEANS

[75] Inventor: James M. Ford, Cleveland, Tenn.

[73] Assignee: Olin Corporation, New Haven, Conn.

[21] Appl. No.: 204,127

[22] Filed: Nov. 5, 1980

[51] Int. Cl.³ .......................... C25B 9/00; C25B 13/08
[52] U.S. Cl. ..................................... 204/252; 204/279; 204/296
[58] Field of Search ................................ 204/252–258, 204/263–266, 279, 284

[56] References Cited

U.S. PATENT DOCUMENTS

| | | | |
|---|---|---|---|
| 4,026,782 | 5/1977 | Bouy et al | 204/254 |
| 4,056,458 | 11/1977 | Pohto et al. | 204/257 X |
| 4,069,129 | 1/1978 | Sato et al. | 204/279 X |
| 4,175,025 | 11/1979 | Creamer et al. | 204/253 |
| 4,207,165 | 6/1980 | Mosé et al. | 204/258 |
| 4,210,516 | 7/1980 | Mosé et al. | 204/284 |
| 4,217,199 | 8/1980 | Cunningham | 204/255 X |
| 4,244,802 | 1/1981 | Pohto et al. | 204/252 |
| 4,253,932 | 3/1981 | Mose et al. | 204/253 |
| 4,342,460 | 8/1982 | Eng | 204/279 X |

FOREIGN PATENT DOCUMENTS 2821983 11/1979 Fed. Rep. of Germany ...... 204/279

Primary Examiner—Donald R. Valentine
Attorney, Agent, or Firm—James B. Haglind; Donald F. Clements

[57] ABSTRACT

The invention relates to an electrolytic cell which is comprised of a first frame member housing an electrode and a second frame member housing an electrode. A separator is positioned between the first frame member and the second frame member. A first sealing means contacts a side of the first frame member and one side of the separator. Contacting the second frame member is a second sealing means having a raised portion which also contacts a side of the separator. Pressing means are provided which press the frames together against the sealing means and the separator to form a substantially fluid-tight seal. The novel electrolytic cells provide the advantages of simultaneously:

a. controlling gasket compression pressures,
b. controlling gasket frame surface structural forces,
c. efficiently forming a seal, and
d. preventing gasket slippage.

8 Claims, 5 Drawing Figures

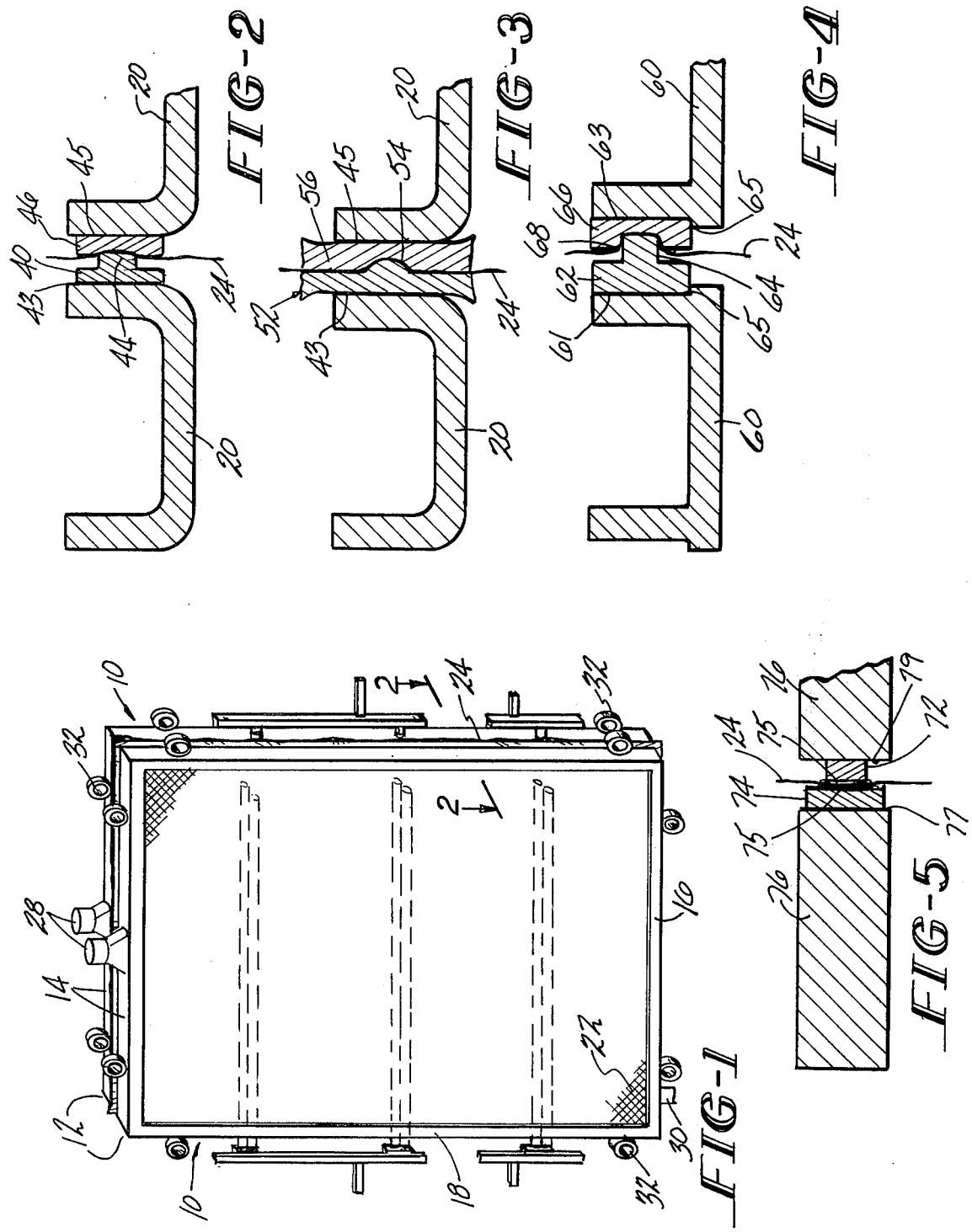

ELECTROLYTIC CELL WITH SEALING MEANS

The present invention relates to a sealing means suitable for use in a filter press type electrolytic cell. More particularly, the invention relates to sealing a separator between adjacent frame members in a filter press cell.

Commercial cells for the production of chlorine and alkali metal hydroxides have been continually developed and improved over a period of time dating back to at least 1892. In general, chloralkali cells are of the deposited asbestos diaphragm type or the flowing mercury cathode type. During the past few years, developments have been made in cells employing separators having ion exchange properties which promise advantages over either diaphragm or mercury cells. It is desirable to take advantage of existing technology particularly in diaphragm cells, but it is also necessary to provide cell designs which meet the requirements of these newer separator materials. Since suitable separator materials such as those marketed by E. I. duPont de Nemours and Company under the trademark Nafion ® and by Asahi Glass Company Ltd. under the trademark Flemion ® are available primarily in sheet form, the most generally used cells employing such separators are of the "filter press" type. Filter press cells may employ electrode structures which are monopolar or bipolar.

In the filter press cell, separators in sheet form are clamped between the sides of frame members. The sealing means employed must effectively provide a fluid tight seal between the frame members and the separator without damaging the separator.

Sealing means for cells employing ion exchange membranes as separators include those described in U.S. Pat. No. 4,026,782 issued May 31, 1977, and P. Bouy et al. and U.S. Pat. No. 4,175,025 issued Nov. 20, 1979, to E. D. Creamer et al.

U.S. Pat. No. 4,026,782 teaches bipolar cells having frames with recesses into which the sealing members fit. In one of these recesses, the diaphragm is sealed into the frame with a putty or caulked gasket. This sealing arrangement requires a complex frame structure.

U.S. Pat. No. 4,175,025 describes filter press frames having at least one recess into which a gasket is formed to fit. The membrane is sized to extend beyond the edges of the frame so that shrinkage of the membrane during regeneration will not prevent its re-use. Adjacent frames may contain recesses which are opposite each other, but of different sizes. Gaskets having different hardnesses are used to seal the membrane between them.

To provide recesses in the frame members of U.S. Pat. Nos. 4,026,782 and 4,175,025, operations such as machining must be employed. These operations add undesired increases to the cost of producing the frames.

It is desired, however, and an object of the present invention to provide sealing means in filter press cells using frames which are simple and in which direct contact between the separator and the frame member is avoided.

Another object of the present invention is to provide sealing means which prevent undesired slippage between the sealing means and the slippery surfaces of the separator wet with electrolytes such as caustic solutions.

A further object of the present invention is to provide sealing means which contribute to the control of the compression pressures employed.

These and other objects of the invention are accomplished in an electrolytic cell comprising:
 a. a first frame member housing an electrode,
 b. a second frame member housing an electrode,
 c. a separator positioned between the first frame member and the second frame member,
 d. a first sealing means contacting a side of the first frame member and one side of the separator,
 e. a second sealing means contacting a side of the second frame member and having a level first portion and a level second portion separated by a raised portion, the raised portion contacting the other side of the separator, and
 f. pressing means for pressing the frames together against the sealing means and the separator so as to form a substantially fluid-tight seal.

Other advantages of the invention will become apparent from reading the description below and the invention will be better understood by references to the attached drawings in which:

FIG. 1 illustrates a front elevation in perspective of a pair of adjacent electrodes employing the novel sealing means of the present invention.

FIG. 2 is an enlarged partial sectional view of the electrodes of FIG. 1 taken along line 2—2 showing one embodiment of the sealing means of the present invention.

FIG. 3 depicts a partial sectional view of another embodiment of the sealing means of the present invention.

FIG. 4 illustrates a partial sectional view of an additional embodiment of the sealing means of the present invention.

FIG. 5 shows a partial sectional view of a further embodiment of the sealing means of the present invention used with bar shaped frames.

Electrodes 10 of FIG. 1 are comprised of frames 12 having tops 14, bottoms 16, and sides 18 and 20. Frames 12 house foraminous electrode surfaces 22. Separator 24 is positioned between adjacent electrodes 10. Electric current is supplied to and removed from electrodes 10 through electrode connectors 24 connected to conductor rods 26 which are attached to electrode surfaces 22. Outlets 28 in tops 14 of frames 12 permit removal of electrolysis products. Inlets 30 permit a liquid to be fed to electrode 10. Guides 32 are included on frames 12 to allow for the proper alignment of electrodes 10.

FIG. 2 shows separator 24 positioned between gaskets 40 and 46 which are placed between sides 20 of frames 12. Gasket 40 is comprised of a base portion which contacts edge 43 of side 20 and raised portion 44 which contacts one side of separator 24. Gasket 46 contacts edge 45 of adjacent side 20 and the other side of separator 24. The area of contact for gasket 46 with separator 24 is greater than that of raised portion 44 of gasket 40.

In the embodiment of FIG. 3, separator 24 is sealed between gaskets 52 and 56 which extend beyond edges 43 and 45 of sides 20 of frames 12. Under compression, separator 24 is effectively sealed between raised portion 54 of gasket 52 and gasket 56.

FIG. 4 illustrates an additional embodiment of the sealing means of the present invention in which one end of gaskets 62 and 66 rest against shoulders 65 of edges 61 and 63 of frames 60. Separator 24 is sealed, during compression, between raised portion 64 of gasket 62 and inset portion 68 of gasket 66.

FIG. 5 shows separator 24 sealed between inserts 75 which prevent undesired friction between separator 24 and narrow gasket 72 and wider gasket 74. Gaskets 72 and 74 are positioned between sides 77 and 79 of bar shaped frames 76.

Suitable as sealing means are gaskets comprised of elastomers such as Neoprene, Hypalon, ethylenepropylene dimonomer (EPDM), or gum rubber. The hardness of the sealing means is not critical and any suitable hardness may be selected independently for either gasket. Preferably, the gaskets have a low degree of hardness which allows the gaskets to fill in irregularities on the frame members and thus permit reduced tolerances which minimizes, for example, machining of metal frames and thus reduces production costs.

Gasket thicknesses are similarly not critical and any suitable thicknesses may be independently selected for each of the gaskets used.

The width of the raised portion of the second gasket is selected to provide less area of contact with the separator than that of the first gasket. Further, the width of the raised portion is selected to provide the desired control of the gasket compression pressures and the gasket frame surface structural forces. Control of these pressures minimize compression set for gasket materials and bending or twisting of frame members. The embodiment of the novel sealing means shown in FIG. 4 is particularly suitable where the electrolytic cell employs higher compression pressures.

The width of the raised portion of the gasket is especially selected to provide the desired control of the gasket compression and of the frame surface structural forces. The width of the raised portion is kept narrow enough not to exceed the structural strength of the frame member. The force on the frame member per lineal inch of frame member is $F_i = P \times W$ where P is the gasket pressure of the raised portion and W is the expanded width of the raised portion in compression.

The expanded width $W = w \div (1-c)$ where w is the initial width of the raised portion and c is the fractional compression expressed as a decimal. The compression factor c is selected high enough to assure sealing, depending upon the gasket material and may be from 0.05 to 0.55 and preferably from 0.2 to 0.4.

A preferred embodiment of the sealing means of the present invention is that of the type illustrated in FIG. 3. The gaskets extend beyond the width of the frame so that the uncompressed gasket material outside of the frame will not slip into the higher pressure zone within the frame. The narrow raised portion of the one gasket mates with a narrow area on the second gasket to effectively seal the separator and take up the greatest amount of compression at the design force load.

Hydraulically permeable or impermeable separators may be employed in the electrolytic cell of the present invention. Preferably, inert flexible separators having ion exchange properties and which are impervious to the hydrodynamic flow of the electrolyte and the passage of gas products produced in the cell are employed. Suitably used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid groups by processes such as hydrolysis. One example of a suitable membrane material having cation exchange properties is a perfluorosulfonic acid resin membrane composed of a copolymer of a polyfluoroolefin with a sulfonated perfluorovinyl ether. The equivalent weight of the perfluorosulfonic acid resin is from about 900 to about 1600 and preferably from about 1100 to about 1500. The perfluorosulfonic acid resin may be supported by a polyfluoroolefin fabric. A composite membrane sold commercially by E. I. duPont de Nemours and Company under the trademark "Nafion" is a suitable example of this membrane.

A second example of a suitable membrane is a cation exchange membrane using a carboxylic acid group as the ion exchange group. These membranes have, for example, an ion exchange capacity of 0.5–4.0 mEq/g of dry resin. Such a membrane can be produced by copolymerizing a fluorinated olefin with a fluorovinyl carboxylic acid compound as described, for example, in U.S. Pat. No. 4,138,373, issued Feb. 6, 1979, to H. Ukihashi et al. A second method of producing the above-described cation exchange membrane having a carboxyl group as its ion exchange group is that described in Japanese Patent Publication No. 1976-126398 by Asahi Glass Kabushiki Gaisha issued Nov. 4, 1976. This method includes direct copolymerization of fluorinated olefin monomers and monomers containing a carboxyl group or other polymerizable group which can be converted to carboxyl groups. Carboxylic acid type cation exchange membranes are available commercially from the Asahi Glass Company under the trademark "Flemion".

Frame components may be in the shape of rectangular bars, C or U channels, cylindrical tubes, elliptical tubes as well as being I-shaped or H-shaped. Preferably, the frame components are in the shape of a C channel as shown in FIGS. 2–3.

The materials of construction for frame components may be any which are resistant to corrosion by the electrolytes and the products of electrolysis. For example, metals such as iron, steel, stainless steel, nickel, titanium, or alloys of these metals may be used. Similarly, plastic materials such as polypropylene, polybutylene, polytetrafluoroethylene, FEP, and chlorendic acid based polyesters can be employed.

Electrolytic cells of the present invention provide the advantages of simultaneously:

(a) controlling gasket compression pressures;
(b) controlling gasket frame surface structural forces;
(c) efficiently forming a seal; and
(d) preventing gasket slippage.

In addition, cell assembly tolerances are improved and construction costs reduced. Lower compression pressures can be employed permitting the use of smaller compression means to further reduce cell costs.

What is claimed is:
1. An electrolytic cell which comprises:
   a. a first frame member housing an electrode,
   b. a second frame member housing an electrode,
   c. a separator positioned between said first frame member and said second frame member,
   d. a first sealing means contacting a planar side of said first frame member and one side of said separator,
   e. a second sealing means contacting a planar side of said second frame member, said second sealing means having a level first portion and a level second portion separated by a raised portion, said raised portion contacting the other side of said separator, the area of contact between said raised portion of said second sealing means and said separator is less than the area of contact between said first sealing means and said separator, and f. pressing means for pressing said frames together against said sealing means and said separator so as to form a substantially fluid-tight seal.

2. The electrolytic cell of claim 1 in which said first sealing means and said second sealing means are gaskets.

3. The electrolytic cell of claim 2 in which said separator is hydraulically permeable.

4. The electrolytic cell of claim 2 in which said separator is hydraulically impermeable.

5. The electrolytic cell of claim 3 or claim 4 in which said second sealing means is comprised of an elastomer selected from the group consisting of Neoprene, Hypalon, EPDM, and gum rubber.

6. The electrolytic cell of claim 5 in which said first frame member and said second frame member are in the form of C channels or U channels.

7. The electrolytic cell of claim 4 in which said hydraulically impermeable separator is a cation exchange membrane comprised of fluorocarbon polymers having cation exchange means selected from the group consisting of sulfonic acid groups, carboxylic acid groups, and mixtures thereof.

8. The electrolytic cell of claim 1 in which said first sealing means has an inset portion for insertion of said raised portion of said second sealing means.

* * * * *

UNITED STATES PATENT AND TRADEMARK OFFICE
CERTIFICATE OF CORRECTION

PATENT NO. : 4,441,977
DATED : April 10, 1984
INVENTOR(S) : James M. Ford

It is certified that error appears in the above-identified patent and that said Letters Patent is hereby corrected as shown below:

Column 1, line 35, delete "and" and insert --to--.

Signed and Sealed this

Nineteenth Day of March 1985

[SEAL]

Attest:

DONALD J. QUIGG

Attesting Officer     Acting Commissioner of Patents and Trademarks